United States Patent
Martinez (10) Patent No.: US 10,069,659 B2
(45) Date of Patent: Sep. 4, 2018

(54) NOISE-SHAPING CREST FACTOR REDUCTION (CFR) METHODS AND DEVICES

(71) Applicant: NXP USA, Inc., Austin, TX (US)

(72) Inventor: Vincent Martinez, Toulouse (FR)

(73) Assignee: NXP USA, INC., Austin, TX (US)

(*) Notice: Subject to any disclaimer, the term of this patent is extended or adjusted under 35 U.S.C. 154(b) by 0 days.

(21) Appl. No.: 15/587,572

(22) Filed: May 5, 2017

(65) Prior Publication Data

US 2017/0331650 A1 Nov. 16, 2017

(30) Foreign Application Priority Data

May 10, 2016 (EP) ..................................... 16290077

(51) Int. Cl.
*H03H 7/40* (2006.01)
*H04L 25/03* (2006.01)
*H04L 27/26* (2006.01)
*H04L 25/08* (2006.01)

(52) U.S. Cl.
CPC .... *H04L 25/03828* (2013.01); *H04L 25/0384* (2013.01); *H04L 27/2623* (2013.01); *H04L 25/08* (2013.01)

(58) Field of Classification Search
CPC .............. H04L 25/03828; H04L 25/08; H04L 25/0384; H04L 27/2623
USPC .......................................................... 375/232
See application file for complete search history.

(56) References Cited

U.S. PATENT DOCUMENTS

| | | | |
|---|---|---|---|
| 2005/0232373 A1* | 10/2005 | Peeters | H04L 27/2624 375/296 |
| 2006/0119492 A1* | 6/2006 | Kim | H03M 1/0614 341/143 |
| 2013/0163512 A1 | 6/2013 | Rexberg et al. | |

* cited by examiner

*Primary Examiner* — Leila Malek (57) ABSTRACT

Embodiments of a noise-shaping crest factor reduction method for a carrier signal (and a device that performs the method) include (a) clipping the carrier signal by selecting at least one carrier signal peak that has a magnitude exceeding a predetermined crest factor reduction threshold, (b) subtracting the resulting clipped signal from the carrier signal, (c) confining, by a noise shaping filter, the resulting clipping noise signal in a frequency band corresponding to that of the carrier signal, and (d) subtracting the resulting spectrally shaped clipping noise signal from a delayed version of the carrier signal. The confining process includes selecting first sub-areas of the noise shaping filter response at one or more guard bands, selecting at least one second sub-area of the noise shaping filter response elsewhere in the frequency band, and setting the first sub-areas to a first predetermined magnitude higher than the magnitude of the second sub-area.

20 Claims, 4 Drawing Sheets

NOISE-SHAPING CREST FACTOR REDUCTION (CFR) METHODS AND DEVICES

CROSS-REFERENCE TO RELATED APPLICATION

This application claims the priority under 35 U.S.C. § 119 of European Patent application no. 16290077.3, filed on May 10, 2016, the contents of which are incorporated by reference herein.

TECHNICAL FIELD

This invention relates to digital signal processing techniques and, more particularly, to techniques for Crest Factor Reduction (CFR) according to a noise shaping process.

BACKGROUND

Nowadays, in order to improve spectral efficiency, modern wireless communication systems use modern modulation and coding scheme techniques that involve multiple subcarriers direct or indirect mapping, such as OFDM (orthogonal frequency division multiplexing), OFDMA (orthogonal frequency division multiple access), SC-FDMA (single-carrier frequency division multiple access), WCDMA (wideband code division multiple access) or multi-carrier GSM (global system for mobile communication). These systems however suffer from high peak to average power ratios (PAPR), which originate from superposing subcarriers or various signals from diverse users. It is known that such kind of high PAPR is undesired because it requires more back-off for the subsequent power amplifier, and thus has a direct consequence on the amplifier's average output power. In order to reduce the dynamics of the incoming composite antenna signal, techniques like Crest Factor Reduction (CFR) are used to improve the PAPR and improve the efficiency of the transmission chain. However such processing algorithms may cause out-of-band spectral regrowth if not designed correctly, leading to non-compliance to regulatory spectral emission masks (SEM).

The noise shaping process is a clipping and filtering crest factor reduction technique which has been proposed to reduce the PAPR. The objective of the noise shaping process is to remove energy from the peaks of a signal and then to add that energy as a noise, inside and outside the signal bandwidth. As a result, the foregoing has the effect of reducing the PAPR as well as introducing in-band distortions which increase the bit-error ratio and also out-of-band degradations which interfere with communications in neighboring frequency bands.

Although effective, it would be desirable to improve the noise shaping process to reduce the PAPR even more.

SUMMARY

Embodiments of the inventive subject matter provide a noise-shaping crest factor reduction method, a non-transitory computer readable storage medium embodying a computer program for performing the method, a device for performing noise-shaping crest factor reduction and a transmitter for a communication system, as described in the accompanying claims. Specific embodiments of the invention are set forth in the dependent claims. These and other aspects of the inventive subject matter will be apparent from and elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

FIG. 3, including

FIG. 5, including

DETAILED DESCRIPTION OF THE PREFERRED EMBODIMENTS

Figure 1:
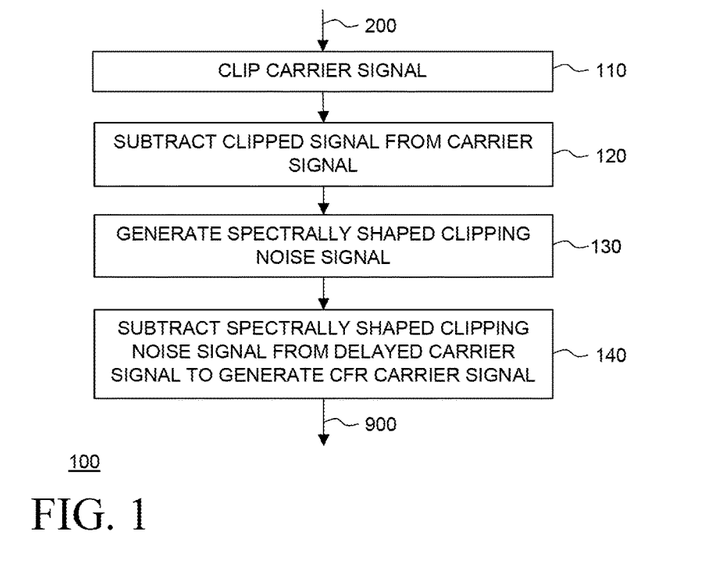
FIG. 1 is a flow chart showing a conventional noise shaping process for a carrier signal.

FIG. 1 is a flow chart showing a conventional noise shaping process 100 for processing an input carrier signal 200 of a communication system. In an example, the communication system is a multi-carrier communication system such as a Long Term evolution (LTE) or a Wideband Code Division Multiple Access (CDMA) communication system. As shown in FIG. 1, operation 110 clips the carrier signal 200 by selecting at least one peak of carrier signal 200 that has a magnitude exceeding a predetermined crest factor reduction threshold, so as to create a clipped signal. Then, operation 120 subtracts the clipped signal from carrier signal 200 in order to generate a clipping noise signal. Thereafter, operation 130 confines, by a noise shaping filter, the clipping noise signal in a frequency band substantially similar to that of carrier signal 200. Operation 130 has the effect of generating a spectrally shaped clipping noise signal, and preventing out-of-band emissions. Finally, operation 140 subtracts the spectrally shaped clipping noise signal from a delayed version of carrier signal 200 thereby generating a crest factor reduced carrier signal 900.

Figure 2:
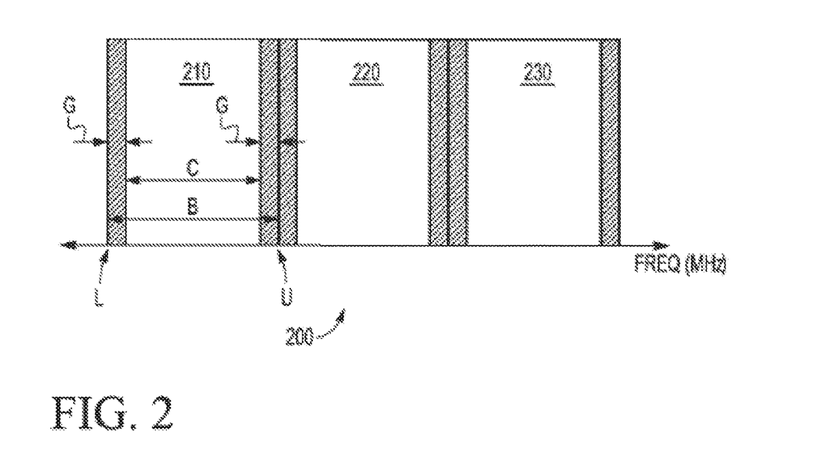
FIG. 2 is a diagram of a carrier signal.

FIG. 2, shows a diagram of an example carrier signal 200 comprising three carriers 210, 220 and 230 which can be used with the conventional noise shaping process 100. As can be seen in FIG. 2, a single carrier such as carrier 210 is allocated to a frequency band B which spans from a lower limit L to an upper limit U. Even if not shown in FIG. 2, carriers 220 and 230 are also arranged in a similar manner to carrier 210. Each of the carriers 210, 220 and 230 comprises two guard bands G and a communication band C. The guard bands G are located at the lower and upper edges of the allocated frequency band B. It is known that guard bands such as guard bands G have the effect of providing a buffer against interference arising from signals from one carrier drifting or leaking over into another. The communication band C is located between the guard bands G, and is used for conveying a communication signal. In an example, each of the carriers 210, 220 and 230 represents a LTE carrier having a 20 megahertz (MHz) frequency band where 1 MHz is allocated to each guard band G and 18 MHz remains for carrying the LTE signal. However, differently configured communication signals may be used without departing from the teachings of the application.

Figure 3A:
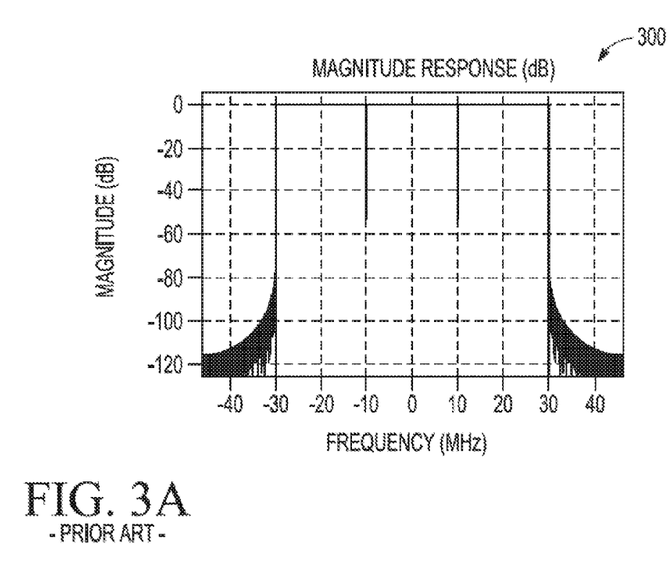
FIGS. 3A and 3B, is a diagram showing a conventional noise shaping filter response and a noise shaping filter response according to an embodiment of the subject application.

FIG. 3(a) shows a diagram of a conventional noise shaping filter response 300 which is used for confining the noise clipping signal of carrier signal 200 of FIG. 2. As can be seen, the conventional noise shaping filter response 300 has three frequency bands, with a first frequency band centered around 0 MHz, a second frequency band ranging from −30 MHz to −10 MHz (e.g., analogous to frequency band B, FIG. 2), and a third frequency band ranging from 10 MHz to 30 MHz, which is substantially similar to that of carrier signal 200. It is understood that applying the conventional noise shaping filter response 300, as shaped, onto the noise shaping signal, would generate a shaped clipping noise signal spectrally distributed in a uniform way over all the frequencies of the frequency band B allocated to carrier signal 200, as well as to the other two frequency bands (i.e., the bands centered around 0 MHz and 20 MHz).

However, it has been noticed that such distribution of the noise clipping signal is not totally optimal since in-band distortion metrics, such as the error vector magnitude (EVM), which are used to assess the increase of bit-error ratio due to the reinjection of the spectrally shaped clipping noise into the carrier signal, do not appear to take into consideration the guard bands of that carrier signal (e.g., guard bands G of FIG. 2). Embodiments of the inventive subject matter reduce even more the in-band distortions, thereby reducing the bit error ratio, by distributing more noise energy into the guard bands G than into the communication band C. Therefore, it is proposed in the various embodiments to selectivity distribute more noise of the noise clipping signal into the guard bands G than into the communication band C instead of distributing the noise clipping signal uniformly as it is done in the conventional noise shaping process 100.

Figure 3B:
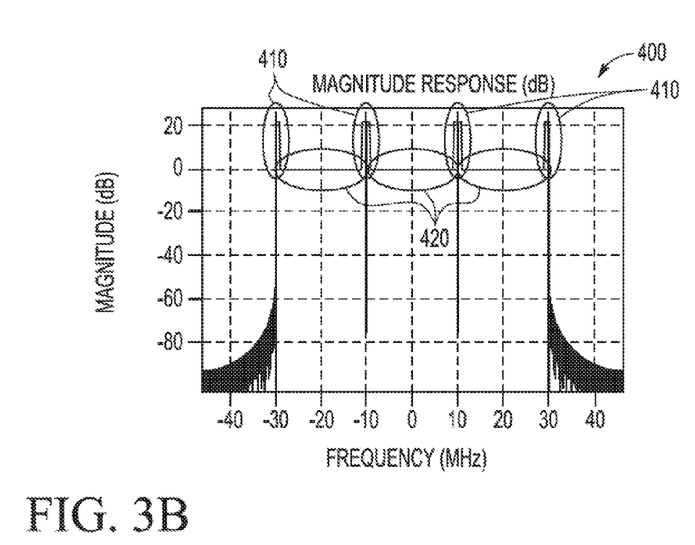

FIG. 3(b) shows a noise shaping filter response 400 according to embodiments of the invention. The noise shaping filter response 400 is arranged for confining the noise clipping signal of carrier signal 200 from FIG. 2. In FIG. 3(b), it can be seen that the response 400 at the parts of the frequency band B (e.g., between −30 MHz and −10 MHz) which are located at the level of the guard bands G (i.e., the two leftmost parts 410 at the upper and lower edges of frequency band B) have a higher magnitude than the part of the frequency band B which is located at the level of the communication band C (i.e., the leftmost part 420). Namely, the noise shaping filter response 400 comprises a plurality of first sub-areas 410 and at least one second sub-area 420. In the example of FIG. 3(b), the noise shaping filter 400 comprises six first sub-areas 410 (with two sub-areas 410 bordering each frequency band and corresponding to the guard bands G) and three second sub-areas 420 (with a sub-area 420 corresponding to the communication band within each frequency band). However, in other configurations, the noise shaping filter response 400 may have more than one second sub-area 420 for each communication band. It is understood that applying the noise shaping filter response 400, as shaped, onto the noise shaping signal, would generate a shaped clipping noise signal spectrally distributed in a selective way over the frequencies of the frequency band B allocated to carrier signal 200, so as to allow more noise of the noise clipping signal to be distributed at the level of the guard bands G than in the communication band C.

Figure 4:
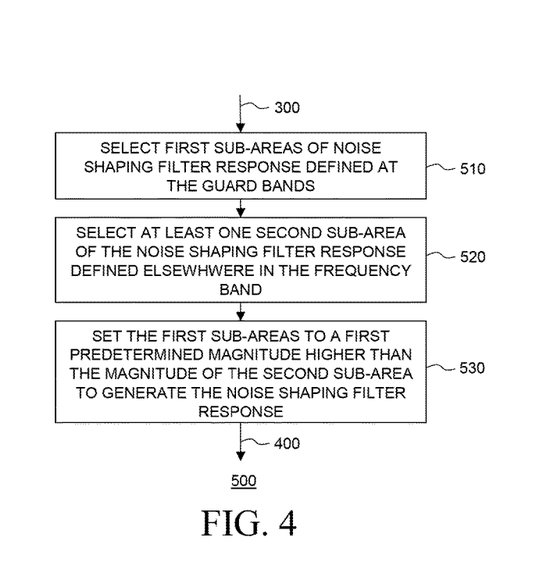
FIG. 4 is a flow chart of a confining operation according to an embodiment of the subject application.

In other words, with respect to the noise shaping process 100 of FIG. 1, operation 130 of FIG. 1 further comprises an additional confining operation 500 as shown in FIG. 4 in accordance with embodiments of the invention. Namely, the confining operation 500 takes the noise shaping filter response 300 as an input and performs some operations in order to generate the noise shaping filter response 400. The foregoing means that the noise shaping filter response 400 has a frequency band B substantially similar to that of the carrier signal 200 along with the magnitude peculiarities introduced by the embodiments of the invention (i.e., higher magnitudes at the guard band locations than the communication band). In one embodiment, the confining operation 500 does not use the noise shaping filter response 300 as an input but rather creates the noise shaping filter response 400 directly according to embodiments of the invention. In FIG. 4, operation 510 selects first sub-areas of the noise shaping filter response 300 defined at the level of the guard bands G of the frequency band B. Later, operation 520 selects at least one sub-area of the noise shaping filter response 300 defined elsewhere in the frequency band B (e.g., sub-area(s) corresponding to the communication band). Finally, operation 530 sets the first sub-areas to a first predetermined magnitude higher than the magnitude of the second sub-area, thereby generating the noise shaping filter response 400.

Figure 5A:
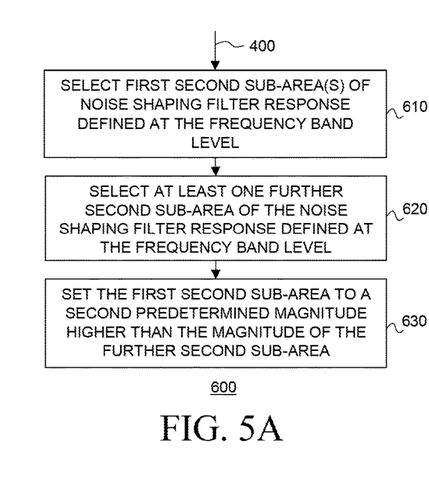
FIGS. 5A and 5B, is a flow chart showing further embodiments according to the subject application.

In one embodiment of the inventive subject matter, the confining operation 500 of FIG. 4 further comprises the operations 600 as shown in FIG. 5(a) which can be used for further confining the noise shaping signal. The foregoing means that the operation 600 takes as an input the noise shaping filter response 400 generated by the confining operation 500. In FIG. 5(a), operation 610 selects at least one first second sub-area 420 of the noise shaping filter 400 defined at the level of the frequency band B of the carrier signal 200 where no data sample is associated with a user of the communication signal. Later, operation 620 selects at least one further second sub-area 420 of the noise shaping filter 400 defined at the level of the frequency band B of carrier signal 200 where one or more data samples are associated with a user of the communication system. Finally, operation 630 sets the first second sub-area 420 to a second predetermined magnitude higher than the magnitude of the further second sub-area 420.

The foregoing embodiment may be used in case of the prior knowledge of the user distribution in the carrier signal 200. In that case, it can be taken advantage of the fact that certain data samples of the carrier signal 200 may not be allocated to a given user. Namely, it is proposed to shape the noise shaping filter response 400 so as to distribute more noise of the noise clipping signal on areas of the frequency band B associated to the carrier signal 200 where no data sample is allocated to a user.

Figure 5B:
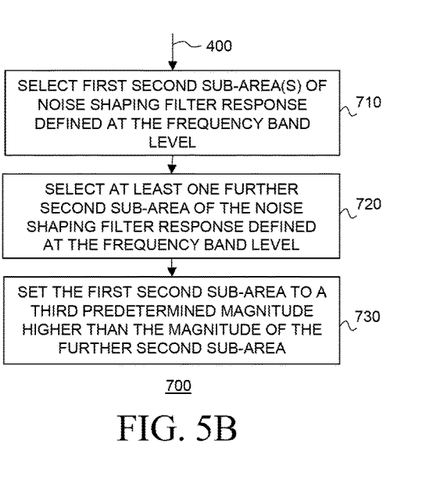

In another embodiment of the inventive subject matter, the confining operation 500 of FIG. 4 further comprises the operation 700 as shown in FIG. 5(b) which can be used for further confining the noise shaping signal. The foregoing means that the operation 700 takes as an input the noise shaping filter response 400 generated by the confining operation 500. In FIG. 5(b), operation 710 selects at least one first second sub-area 420 of the noise shaping filter 400 defined at the level of the frequency band B of the carrier signal 200 where one or more data samples 200 are modulated according to a first modulation and coding scheme (e.g., phase shift keying (PSK), quadrature amplitude modulation (QAM), or some other modulation type). Later, operation 720 selects at least one further second sub-area 420 of the noise shaping filter 400 defined at the level of the frequency band B of carrier signal 200 where one or more data samples 200 are modulated according to a second modulation and coding scheme of an order different from (e.g., lower than) the first modulation and coding scheme. Finally, operation 730 sets the first second sub-area 420 to a third predetermined magnitude higher than the magnitude of the further second sub-area 420. The foregoing embodiments take for example into consideration two LTE users associated with a carrier signal which are using respectively quadrature phase shift keying (QPSK) and 64QAM modulations and coding schemes. In that case, it is known that each user will not have the same EVM or signal to noise ratio (SNR) targets. Therefore, the tolerated amount of noise will not be constant across the frequency range, and the clipping noise signal can be adjusted accordingly, typically by stuffing more noise into the QPSK user frequencies than into the 64QAM user frequencies for example.

The foregoing embodiment may be used in case of the prior knowledge of the modulation and coding scheme associated to the data samples of the carrier signal 200. In that case, it can be taken advantage of the fact that certain data samples of the carrier signal 200 may allow more noise than others which are modulated with a higher order modulation and coding scheme and that are more sensitive to noise. Namely, it is proposed to shape the noise shaping filter 400 so as to distribute more noise of the noise clipping signal on areas of the frequency band B corresponding to the carrier signal 200 where data samples are modulated according to low order modulations and coding schemes that are less sensitive to noise, such as those which require a high EVM target.

In an example, the first predetermined magnitude is higher than or equal to the second and/or third predetermined magnitudes. For instance, the first predetermined magnitude may be 20 dB higher than the second predetermined magnitude and 30 dB higher than the third predetermined magnitude. However, other appropriate values may also be contemplated without departing from the teachings of the inventive subject matter.

In another example, the confining operation 500 of FIG. 4 is performed dynamically at each common time period of the communication system, such as a time slot in a GSM communication system or a subframe in a LTE communication system. This way, the noise shaping filter response 400 is constantly adapted to the distribution of the users of the communication, which is known to be dynamic as users are moving throughout the communication system. Therefore, one should understand that in such case, the noise shaping filter response 400 is not defined once for all, but is redefined at each time period in response to the change of the distribution of the users.

In a further embodiment of the inventive subject matter, operation 500 further comprises selecting one first sub-area of the noise shaping filter response 400 defined at the level of the guard bands G of the frequency band B associated with two contiguous carriers of carrier signal 200. Hence, where two carriers of a carrier signal are contiguous, it may be possible to arrange the noise shaping filter response 400 at the level of their guard bands G so as to cover simultaneously two directly adjacent guard bands G of the contiguous carriers. This guard-band stuffing area can either correspond to the frequencies in between two transmitting adjacent carriers, or at the outermost edges of a lonely carrier, provided that such frequencies are not affected by any filtering that is taking place in the analog domain.

In FIG. 3(b), the first sub areas 410 have a substantially rectangular shape (e.g., between magnitudes 0 dB and 20 dB). In another example, the first sub-areas may have a reverse U shape or a pyramid shape. However, other appropriate shapes may also be contemplated without departing from the teachings of the inventive subject matter.

In other embodiments of the invention, it is proposed to repeat a plurality of times, all the operations of FIG. 1 as modified by the invention in view of the above description of FIGS. 3, 4 and 5. The foregoing feature has the effect of reducing any increase in peak to average power ratio generated by the noise shaping filter response 400.

In an embodiment of the inventive subject matter, it is proposed to delay the carrier signal 200 by a time corresponding to the delay introduced by the noise filtering 110, which is typically implemented with Finite Impulse Response (FIR) filters.

One would note that the proposed solutions bring improvements over conventional noise shaping process 100. Embodiments of the proposed solution may result in improving the bit error ratio due to the reduction of the in-band distortions, most of which are pushed to the guard bands G. Indeed, since a significant amount (e.g., most) of the noise clipping signal is distributed to the guard bands G, less noise may be experienced in the communication band C. Therefore in-band distortions may be automatically reduced, which may lead to an improvement of the bit error ratio. This then may enable a subsequent power amplifier that receives the filtered signal to deliver higher average output power.

Of course, the above advantages are exemplary, and these or other advantages may be achieved by the proposed solution. Further, a skilled person will appreciate that not all advantages stated above are necessarily achieved by embodiments described herein.

Embodiments of the above-proposed solution may also be performed by a computer program embodied in a non-transitory computer readable storage medium.

Figure 6:
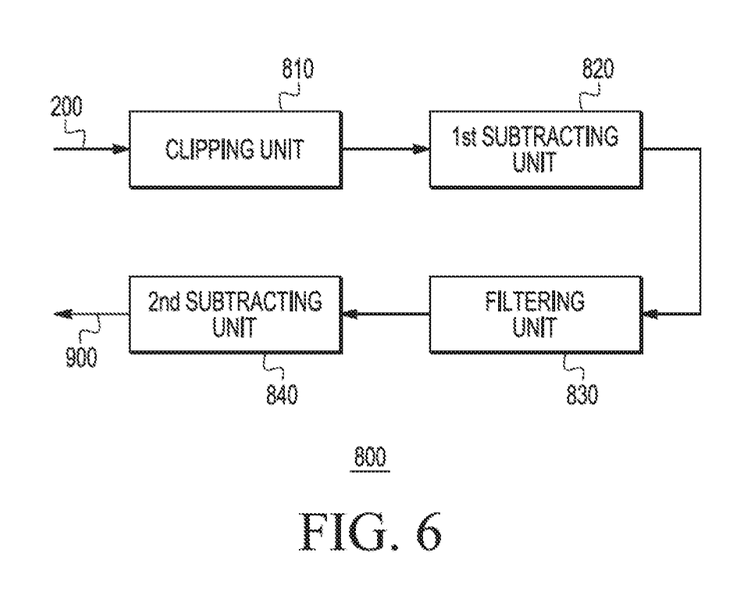
FIG. 6 is a block diagram of a device according to an embodiment of the subject application.

Further, as shown in FIG. 6, the embodiments of the proposed solution may also be implemented in device 800 for performing noise shaping crest factor reduction to a carrier signal (e.g., carrier signal 200). In device 800, a clipping unit 810 is arranged for clipping the carrier signal 200 by selecting at least one peak of the carrier signal 200 that has a magnitude exceeding a predetermined crest factor reduction threshold, thereby creating a clipped signal. A first subtracting unit 820 is arranged for subtracting the clipped signal from the carrier signal 200, thereby generating a clipping noise signal. A filtering unit 830 is arranged for confining, by a noise shaping filter having a noise shaping filter response 400, the clipping noise signal in a frequency band B substantially similar to that of the carrier signal 200, thereby generating a spectrally shaped clipping noise signal. A second subtracting unit 840 is arranged for subtracting the spectrally shaped clipping noise signal from a delayed version of the carrier signal 200, thereby generating a crest factor reduced carrier signal 900. In accordance with embodiments of the invention, filtering unit 830 further includes:

a first selecting unit for selecting first sub-areas of a noise shaping filter response (e.g., response 300) defined at the level of the guard bands G of a frequency band B;

a second selecting unit for selecting at least one second sub-area of a noise shaping filter response (e.g., response 300) defined elsewhere in the frequency band B; and a setting unit for setting the first sub-areas to a first predetermined magnitude higher than the magnitude of the second sub-area.

In an embodiment, first and second subtracting units 820, 840 are comprised of a single subtracting unit.

As shown in FIG. 6, clipping unit 810, first and subtracting units 820, 840 and filtering unit 830 may be further arranged to perform, at least, operations 500, 600 and 700 as described above. In addition, a repeating unit (not shown) and a delaying unit (not shown) may be added to device 800 so as to perform previously-described repeating operations and delaying operations, respectively.

Device 800 may also be integrated in a transmitter of a communication system such as those already described above.

Embodiments of a noise-shaping crest factor reduction method for a carrier signal of a communication system, the carrier signal comprising one or more carriers, include (a) clipping the carrier signal by selecting at least one peak of the carrier signal that has a magnitude exceeding a predetermined crest factor reduction threshold thereby creating a clipped signal, (b) subtracting the clipped signal from the carrier signal, thereby generating a clipping noise signal, (c) confining, by a noise shaping filter, the clipping noise signal in a frequency band substantially similar to that of the carrier signal, thereby generating a spectrally shaped clipping noise signal, and (d) subtracting the spectrally shaped clipping noise signal from a delayed version of the carrier signal, thereby generating a crest factor reduced carrier signal. The confining process includes selecting first sub-areas of a response of the noise shaping filter defined at the level of one or more guard bands of the frequency band, selecting at least one second sub-area of the response of the noise shaping filter defined elsewhere in the frequency band, and setting the first sub-areas to a first predetermined magnitude higher than the magnitude of the second sub-area.

Embodiments of a device for performing noise-shaping crest factor reduction to a carrier signal of a communication system, the carrier signal comprising one or more carriers, include a clipping unit, a first subtracting unit, a filtering unit, and a second subtracting unit coupled together in series. Each of the units may be implemented in hardware (e.g., as logic blocks). The clipping unit clips the carrier signal by selecting at least one peak of the carrier signal that has a magnitude exceeding a predetermined crest factor reduction threshold thereby creating a clipped signal. The first subtracting unit subtracts the clipped signal from the carrier signal, thereby generating a clipping noise signal. The filtering unit confines, with a noise shaping filter, the clipping noise signal in a frequency band substantially similar to that of the carrier signal, thereby generating a spectrally shaped clipping noise signal. The second subtracting unit subtracts the spectrally shaped clipping noise signal from a delayed version of the carrier signal, thereby generating a crest factor reduced carrier signal. The filtering unit includes a first selecting unit that selects first sub-areas of a response of the noise shaping filter defined at the level of one or more guard bands of the frequency band, a second selecting unit that selects at least one second sub-area of the response of the noise shaping filter defined elsewhere in the frequency band, and a setting unit that sets the first sub-areas to a first predetermined magnitude higher than the magnitude of the second sub-area.

The device may be embodied as a hardware module and/or integrated circuit that includes various processing units and/or logic blocks configured to perform the functionality of the units. The device may be incorporated into a transmitter system, which also includes a power amplifier and an antenna. The power amplifier is coupled to the device to receive the crest factor reduced signal (or a further processed version thereof), where the power amplifier amplifies the received signal, and provides the amplified signal to the amplifier for transmission over an air interface.

In the foregoing specification, the proposed solution has been described with reference to specific examples of embodiments of the proposed solution. It will, however, be evident that various modifications and changes may be made therein without departing from the broader scope of the proposed solution as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of devices or logic blocks to achieve the same functionality is effectively "associated" such that the desired functionality is achieved. Hence, any two devices or logic blocks herein combined to achieve a particular functionality may be seen as "associated with" each other such that the desired functionality is achieved, irrespective of architectures or intermediate devices. Likewise, any two devices or logic blocks so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or operations then those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A noise-shaping crest factor reduction method for a carrier signal of a communication system, the carrier signal comprising one or more carriers, the method comprising:

(a) clipping the carrier signal by selecting at least one peak of the carrier signal that has a magnitude exceeding a predetermined crest factor reduction threshold thereby creating a clipped signal;
(b) subtracting the clipped signal from the carrier signal, thereby generating a clipping noise signal;
(c) confining, by a noise shaping filter, the clipping noise signal in a frequency band substantially similar to that of the carrier signal, thereby generating a spectrally shaped clipping noise signal; and
(d) subtracting the spectrally shaped clipping noise signal from a delayed version of the carrier signal, thereby generating a crest factor reduced carrier signal, wherein the confining includes
selecting first sub-areas of a response of the noise shaping filter defined at the level of one or more guard bands of the frequency band,
selecting at least one second sub-area of the response of the noise shaping filter defined elsewhere in the frequency band, and
setting the first sub-areas to a first predetermined magnitude higher than the magnitude of the second sub-area.

2. The method of claim 1 wherein the confining further comprises:
selecting at least one first second sub-area of the response of the noise shaping filter defined at the level of the frequency band of the carrier signal where no data sample is associated with a user of the communication system;
selecting at least one further second sub-area of the response of the noise shaping filter defined at the level of the frequency band of the carrier signal where one or more data samples of the carrier signal are associated with a user of the communication system; and
setting the first second sub-area to a second predetermined magnitude higher than the magnitude of the further second sub-area.

3. The method of claim 1 wherein the confining further comprises:
selecting at least one first second sub-area of the response of the noise shaping filter defined at the level of the frequency band of the carrier signal where one or more data samples of the carrier signal are modulated according to a first modulation and coding scheme;
selecting at least one further second sub-area of the response of the noise shaping filter defined at the level of the frequency band of the carrier signal where one or more data samples of the carrier signal are modulated according to a second modulation and coding scheme of an order lower than the first modulation and coding scheme; and
setting the first second sub-area to a second predetermined magnitude higher than the magnitude of the further second sub-area.

4. The method of claim 3 wherein the first predetermined magnitude is higher or equal to the second predetermined magnitude.

5. The method of claim 1 further comprising:
dynamically performing the confining at each common time period of the communication system.

6. The method of claim 1 wherein the confining further comprises:
selecting one first sub-area of the response of the noise shaping filter defined at the level of the guard bands of the frequency bands associated with two contiguous carriers of the carrier signal.

7. The method of claim 1 wherein the first sub-areas have a: rectangular shape, a reverse U-shape or a pyramid shape.

8. The method of claim 1, further comprising:
repeating operations (a) to (d) a plurality of times.

9. The method of claim 1, further comprising:
delaying the carrier signal by a time corresponding to a time delay introduced by operation (c).

10. The method of claim 2 wherein the first predetermined magnitude is higher or equal to the second predetermined magnitude.

11. A non-transitory computer readable storage medium embodying a computer program for performing a method that includes the steps of:
clipping a carrier signal by selecting at least one peak of the carrier signal that has a magnitude exceeding a predetermined crest factor reduction threshold thereby creating a clipped signal;
subtracting the clipped signal from the carrier signal, thereby generating a clipping noise signal;
confining, by a noise shaping filter, the clipping noise signal in a frequency band substantially similar to that of the carrier signal, thereby generating a spectrally shaped clipping noise signal, wherein confining is performed by
selecting first sub-areas of a response of the noise shaping filter defined at the level of one or more guard bands of the frequency band,
selecting at least one second sub-area of the response of the noise shaping filter defined elsewhere in the frequency band, and
setting the first sub-areas to a first predetermined magnitude higher than the magnitude of the second sub-area; and
subtracting the spectrally shaped clipping noise signal from a delayed version of the carrier signal, thereby generating a crest factor reduced carrier signal.

12. A device for performing noise-shaping crest factor reduction to a carrier signal of a communication system, the carrier signal comprising one or more carriers, the device comprising:
a first circuit element that clips the carrier signal by selecting at least one peak of the carrier signal that has a magnitude exceeding a predetermined crest factor reduction threshold thereby creating a clipped signal;
a second circuit element that subtracts the clipped signal from the carrier signal, thereby generating a clipping noise signal;
a third circuit element that confines, by a noise shaping filter, the clipping noise signal in a frequency band substantially similar to that of the carrier signal, thereby generating a spectrally shaped clipping noise signal, wherein the third circuit element includes
a fourth circuit element that selects first sub-areas of a response of the noise shaping filter defined at the level of one or more guard bands of the frequency band;
a fifth circuit element that selects at least one second sub-area of the response of the noise shaping filter defined elsewhere in the frequency band, and
a sixth circuit element that sets the first sub-areas to a first predetermined magnitude higher than the magnitude of the second sub-area; and
a seventh circuit element that subtracts the spectrally shaped clipping noise signal from a delayed version of the carrier signal, thereby generating a crest factor reduced carrier signal.

13. The device of claim 12 wherein:
the fourth circuit element further selects at least one first second sub-area of the response of the noise shaping filter defined at the level of the frequency band of the carrier signal where no data sample is associated with a user of the communication system;
the fifth circuit element further selects at least one further second sub-area of the response of the noise shaping filter defined at the level of the frequency band of the carrier signal where one or more data samples of the carrier signal are associated with a user of the communication system; and
the sixth circuit element further sets the first second sub-area to a second predetermined magnitude higher than the magnitude of the further second sub-area.

14. The device of claim 12 wherein:
the fourth circuit element further selects at least one first second sub-area of the response of the noise shaping filter defined at the level of the frequency band of the carrier signal where one or more data samples of the carrier signal are modulated according to a first modulation and coding scheme;
the fifth circuit element further selects at least one further second sub-area of the response of the noise shaping filter defined at the level of the frequency band of the carrier signal where one or more data samples of the carrier signal are modulated according to a second modulation and coding scheme of an order lower than the first modulation and coding scheme; and
the sixth circuit element further sets the first second sub-area to a third predetermined magnitude higher than the magnitude of the further second sub-area.

15. The device of claim 13 wherein the first predetermined magnitude is higher or equal to the second predetermined magnitude.

16. The device of claim 12 wherein:
the fourth circuit element further selects one first sub-area of the response of the noise shaping filter defined at the level of the guard bands of the frequency bands associated with two contiguous carriers of the carrier signal.

17. The device of claim 12 wherein the first sub-areas have a: rectangular shape, a reverse U-shape or a pyramid shape.

18. The device of claim 12 wherein:
the second and seventh circuit elements further subtract the clipped signal or the noise signal from the carrier signal or the delayed carrier signal, respectively.

19. The device of claim 12, further comprising:
an eighth circuit element that repeats, a plurality of times, the operations of the first, second, third, and seventh circuit elements.

20. The device of claim 12, further comprising:
an eighth circuit element that delays the carrier signal by a time corresponding to a time required to perform the operations of the first, second, third, and seventh circuit elements.

* * * * *